Inventor:
Charles G. Melanson,
by Walter E. Lombard
Atty.

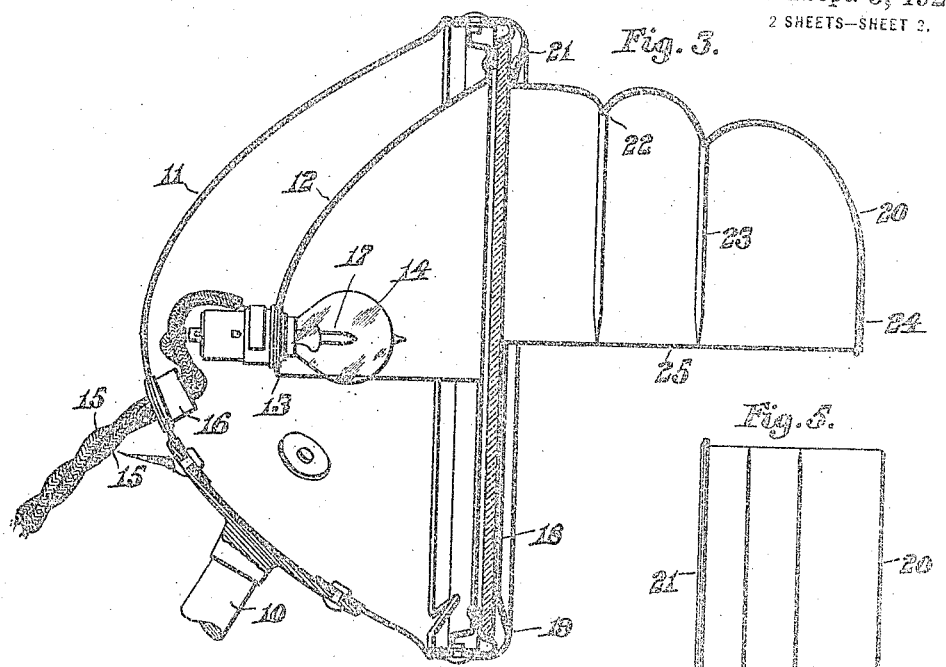
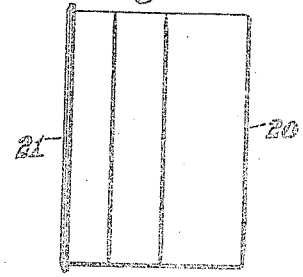
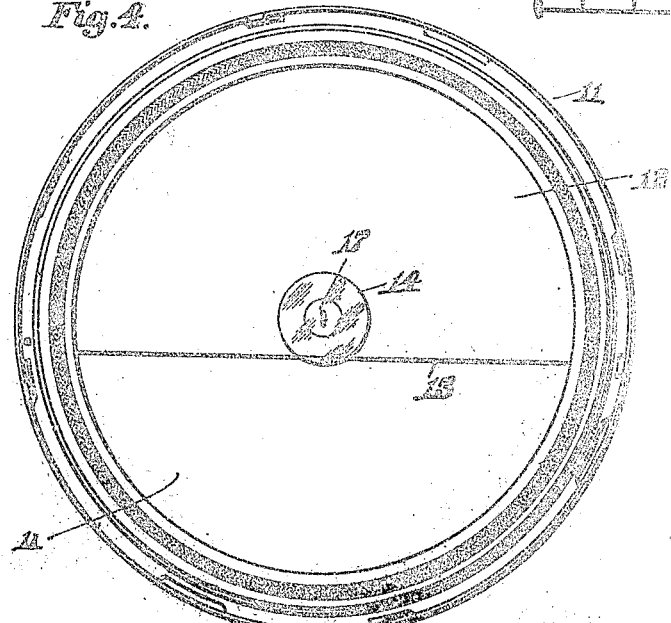

Patented Sept. 5, 1922.

1,428,109

UNITED STATES PATENT OFFICE.

CHARLES GILBERT MELANSON, OF LYNN, MASSACHUSETTS.

HEADLIGHT.

Application filed August 16, 1921. Serial No. 492,806.

*To all whom it may concern:*

Be it known that I, CHARLES G. MELANSON, a citizen of the United States of America, and a resident of Lynn, in the county of Essex and State of Massachusetts, have invented certain new and useful Improvements in Headlights, of which the following is a specification.

This invention relates to headlights particularly adapted for use on motor vehicles to illuminate the road in advance of the moving vehicle.

The main object of the invention is the production of a headlight which will project all of the illuminating rays from the lamp directly forward and downward and permit no rays to be projected upwardly into the eyes of approaching pedestrians or onto the windshields of vehicles moving in either direction in front of the headlight.

A further object of the invention is the provision of means whereby some of the illuminating rays from the lamp will be deflected rearwardly from an opaque vizor in front of the lamp onto the reflecting surface within the casing from which said rays, greatly intensified, will be projected.

A further object of the invention is the provision of an opaque vizor having a plurality of curved reflecting surfaces formed in its inner face, these surfaces being adapted to deflect a portion of the lamp rays into the interior of the casing.

The invention consists primarily in extending the reflecting surface in the casing downwardly over the upper wall of the casing and terminating it at a point adjacent the bottom of the lamp thereby making it impossible to project any of the illuminating rays upwardly.

The invention consists further in a vizor of peculiar construction provided on its inner face with a plurality of mirrored surfaces adapted to deflect a portion of the lamp rays rearwardly into the casing.

The invention further consists in certain novel features of construction and arrangement of parts which will be understood readily by reference to the description of the drawings and to the claims to be hereinafter given.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described except as required by the scope of the appended claims.

Of the drawings:

Figure 3 represents a vertical section of same on line 3, 3, on Fig. 2.

Figure 4 represents a front elevation of same with hood and retaining rim removed, and Figure 5 represents a plan of the hood drawn to a reduced scale.

Similar characters indicate like parts throughout the several figures of the drawings.

Figure 1:
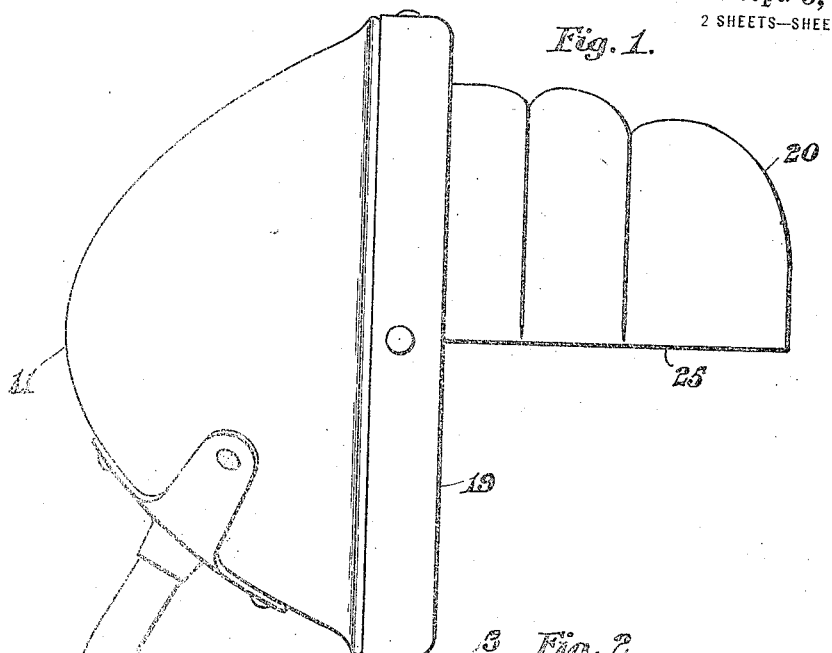
Figure 1 represents a side elevation of a headlight embodying the principles of the present invention.
Figure 2:
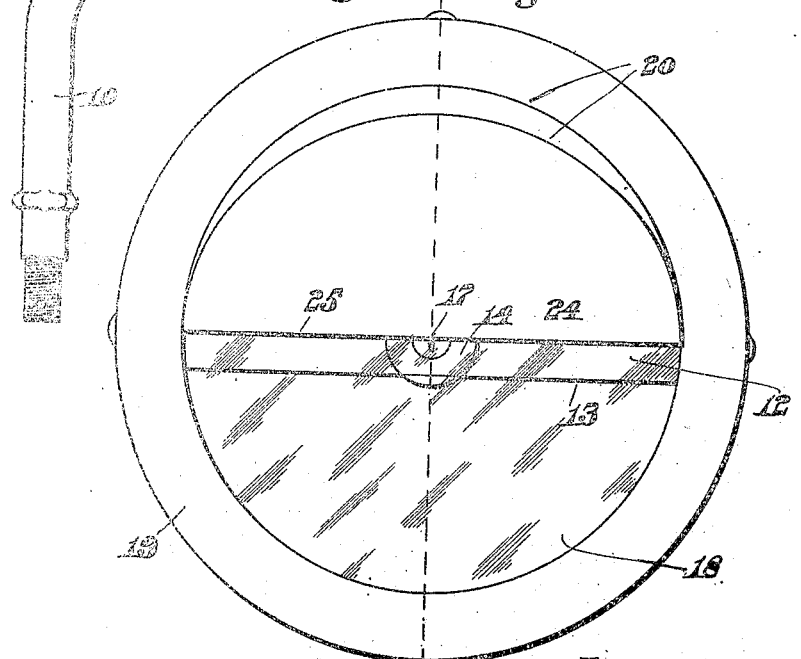
Figure 2 represents a front elevation of the same.

In the drawings, 10 is the usual headlight support adapted to be secured to a motor vehicle and having attached to its upper end the casing 11.

Within the casing 11 is a reflector 12 which extends over the upper portion of the inner wall of the casing 11 and terminates at 13 slightly below the center of said casing, thereby leaving the lower part of the blackened inner wall of the casing exposed to view.

Axially disposed in the casing 11 and supported in the reflector 12 near its lower horizontal edge 13 is the lamp 14 to which electric current is supplied through the wires 15 extending outwardly through a tubular member 16 mounted in the casing 11.

In order to get best results from the lamp 14, the filament 17 thereof is disposed vertically therein.

The front end of the casing 11 has mounted therein, the clear lens 18 which is secured in position by means of the retaining ring 19 which may be locked to the casing 11 in any well-known manner.

In front of the lens 19 is a vizor 20, the rear end of which has a flange 21 inserted between said lens 18 and the front part of the retaining ring 19.

The vizor 20 is provided with a plurality of curved depressions formed by the inwardly extending ridges 22, 23 and the front wall 24.

This front wall has a portion thereof vertical and the entire inner surface of the vizor 20 is mirrored so that a great part of the illuminating rays from the lamp 14 projected onto said mirrored surface are reflected rearwardly onto the reflector 12 from which they are projected forwardly in advance of the vehicle.

By means of this duplex reflection the rays finally projected through the lens 18 are greatly intensified.

The lower edge 25 of the vizor 20 is approximately opposite the center of the lamp 14 and slightly above the lower edge 13 of the reflector 12 so that both direct rays and rays deflected from the vizor 20 are projected forwardly from the reflector 12 in a horizontal strata which will illuminate the road far ahead of the car while other rays from said reflector will be projected upon the road between the vehicle and the intensely illuminated portion of the road far in advance of the car.

By eliminating the lower part of the reflector no rays can be projected upwardly from the headlight.

As the vizor 20 is opaque, no illuminating rays from the lamp 14 can be projected upwardly into the eyes of approaching pedestrians or onto the windshield of an approaching car.

It is obvious the vizor 20 may be provided with any desired number of ridges 22, 23.

This makes a very inexpensive form of headlight for motor vehicles which has the advantage of concentrating the lamp rays where most needed and intensely illuminating the road at the required distance in advance of the vehicle.

It is believed that the invention will be thoroughly understood from the foregoing without further description.

Having thus described my invention, I claim:

1. The combination with a casing, a lamp therein; a reflector within said casing extending over the upper interior wall thereof and terminating at a point adjacent the bottom of said lamp; and a vizor in front of said reflecting surface and having a plurality of concaved depressions in the rear face thereof each provided with a mirrored surface adapted to deflect certain of the lamp rays rearwardly against said reflector.

2. The combination with a casing, a lamp therein; a reflector within said casing extending over the upper interior wall thereof and terminating at a point adjacent the bottom of said lamp; and a vizor in front of said reflecting surface and having a plurality of depressions in the rear face thereof each provided with a mirrored surface, said depressions being parallel with the front of said casing.

3. The combination with a casing; a reflector located in the upper part of the casing; a lamp in front of said reflector; a clear lens in front of the lamp; and an opaque vizor in front of the lens, the inner face of which is mirrored and provided with a plurality of parallel curved surfaces adapted to reflect rearwardly a portion of the illuminating rays from the lamp against the reflecting interior surface of said reflector.

4. The combination with a casing; a reflector, the lower edge of which is just below the center of the casing; a lamp in front of said reflector; a clear lens in front of said lamp; and an opaque vizor in front of the lens having a plurality of mirrored projections on its inner face adapted to deflect certain of the lamp rays against the reflecting interior surface of said reflector.

5. The combination with a casing; a reflector therein; a lamp in front of said reflector; a clear lens in front of said lamp; and an inclined opaque vizor in front of the lens with its lower edge opposite the center of the lamp and having a plurality of mirrored projections on its inner face parallel with the front face of said lens, adapted to deflect certain of the lamp rays against the reflecting interior surface of said reflector.

6. The combination with a casing; a reflector therein, the lower edge of which is just below the center of the casing; a lamp supported by said reflector in front of its lower edge; a clear lens in front of said lamp; and an inclined vizor in front of the lens with its lower edge opposite the center of the lamp and having a plurality of curved reflecting surfaces adapted to deflect a portion of the illuminating rays from the lamp rearwardly toward the reflecting surface of said reflector.

Signed by me at 294 Washington St., Boston, Mass., this 15th day of August, 1921.

CHARLES GILBERT MELANSON.

Witnesses:
WALTER E. LOMBARD,
NATHAN C. LOMBARD.